United States Patent [19]

Gee et al.

[11] Patent Number: 4,690,488

[45] Date of Patent: Sep. 1, 1987

[54] COMPENSATION FOR OPTICAL DAMAGE OF DIRECTIONAL-COUPLER SWITCHES

[75] Inventors: Caroline M. Gee, Woodland Hills; Gary D. Thurmond, Thousand Oaks, both of Calif.

[73] Assignee: Hughes Aircraft Company, Los Angeles, Calif.

[21] Appl. No.: 606,507

[22] Filed: May 3, 1984

[51] Int. Cl.[4] .............................................. G02B 6/10
[52] U.S. Cl. ................................ 350/96.12; 350/96.13; 350/96.14
[58] Field of Search ................... 430/290; 350/96.14, 350/354, 96.13, 96.12, 96.11, 353, 3.6, 3.61, 3.64, 320

[56] References Cited

U.S. PATENT DOCUMENTS

| | | | |
|---|---|---|---|
| 3,689,264 | 9/1972 | Chandross et al. | 430/1 |
| 3,864,130 | 2/1975 | Nassenstein | 96/38.3 |
| 4,157,860 | 6/1979 | Marcatili | 350/355 |
| 4,262,993 | 4/1981 | Burns et al. | 350/355 |
| 4,312,562 | 1/1982 | Segawa et al. | 350/96.14 |

OTHER PUBLICATIONS

Schmidt et al., *J. Appl. Phys.*, 51(1), Jan. 1980, "Optically Induced Crosstalk in LiNbO$_3$ Waveguide Switches", pp. 90–93.

*Primary Examiner*—William L. Sikes
*Assistant Examiner*—Frank González
*Attorney, Agent, or Firm*—V. D. Duraiswamy; V. G. Laslo; A. W. Karambelas

[57] ABSTRACT

The present invention is directed to a process and product of a process in the field of optical directional coupler switches. The application of laser light to the input ports of a coupler switch at a power level approximately twice or greater the operational power level that has been discovered to cause optical damage produces a remedial effect of stabilizing the switching characteristics of the optical coupler switch. The resulting optical coupler switch has improved transmission characteristics when measured by a transfer function over that of an untreated coupler switch.

21 Claims, 4 Drawing Figures

COMPENSATION FOR OPTICAL DAMAGE OF DIRECTIONAL-COUPLER SWITCHES

BACKGROUND OF THE INVENTION

1. Origin of the Invention

The invention described herein was made in the performance of work under a NASA Contract and is subject to the provisions of Section 305 of the National Aeronautics and Space Act of 1958, Public Law 85-568 (72 STAT 435; 43 USC 2457).

2. Background of the Invention

The present invention relates to a process of stabilizing an optical directional coupler switch and to an improved switch produced by such a process, and more particularly to an optical method for reducing cross-talk in ferroelectric crystal waveguide switches.

3. Brief Description of the Prior Art

Integrated optical switches such as titanium-diffused optical waveguides of ferroelectric lithium niobate ($LiNbO_3$) have led to relatively efficient highspeed electro-optical directional coupler switches and modulators. These devices are capable of being utilized in various fiber optic systems. Their utilization would be more practical if their power level capabilities could be increased.

There are presently available infrared semiconductors lasers that are capable of emitting several milliwatts of power. The optical switches, however, are limited to a few tens of microwatts in the infrared range of 800 to 900 nanometers. Experience has found that cross-talk between the coupled waveguides slowly increases even when the applied field voltage is held constant, at a rate which apparently depends on the optical intensity in the waveguides. This problem has been defined as optical damage in the prior art. Cross-talk drift occurs even at relatively low power levels.

An analysis of this problem was set forth in the January 1980 *Journal of Applied Physics*, page 90, in the article "Optically-Induced Cross-Talk in $LiNbO_3$ Switches" by Schmidt et al. The conclusion of the article was that the cross-talk drift at a wavelength of 633 nanometers was believed to occur because of the photorefractive effect of $LiNbO_3$. The photorefractive effect refers to the optically-induced change of refractive index observed in $LiNbO_3$ crystals. It was believed that such an index of refraction change is due to the charge transfer of photoexcited carriers from impurities or defects in the crystals to trapping sites. A space charge field is created which causes a change of the refractive index via the electro-optical effect. In the same way, photocarriers, which are excited in the waveguide, drift in the direction of the applied field, thereby reducing the magnitude of the field in the waveguide region. This effect correspondingly increases the optical cross-talk between the waveguides. It has been discovered that increasing the magnitude of the external field after the cross-talk drift has saturated will restore the switch to its original low cross-talk value. The time dependence of the cross-talk level is dependent on the past exposure of the switch since the magnitude of the space charge field, its spatial distribution and its persistence dependent on details of the trapping of carriers in the crystal. The article further described an experiment at 1060 nanometers. While noting that relatively low cross-talk drift was observed, it was unable to account for the amount of refractive index changes that occurred at the longer wavelength. The conclusion to the article suggested that the cross-talk drift problem or optical damage effect could possibly be eliminated by reducing the impurity content of the crystals or by varying the chemical composition or stoichiometry of the waveguides.

The prior art further discloses that optical changes in the index of refraction of dielectric bodies such as lithium niobate have been observed in the presence of visible and ultraviolet electromagnetic radiation such as disclosed in the Chandross et al. U.S. Pat. No. 3,689,264. The invention in this patent was directed at providing an irreversible index of refraction change in polymethacrylate material that was sensitized by introducing peroxide before polymerizing the material at a low temperature with a subsequent exposure to ultraviolet radiation. The Nassenstein et al. U.S. Pat. No. 3,864,130 is cited of general interest to disclose the capability of producing optical waveguides having a gradient refractive index on dielectric material.

The prior art is still seeking a stabilized optical directional coupler switch that is capable of effectively transmitting higher light intensities with a minimum of optical damage or deleterious crosstalk.

SUMMARY OF THE INVENTION

The present invention provides a process of stabilizing an optical directional coupler switch having, for example, lithium niobate waveguides appropriately coupled to permit a switching function. The process steps include applying electromagnetic energy in a wavelength range such as in the infrared range at a power level, at least approximately twice the normal operating level of the coupler switch, for a predetermined time period sufficient to change the indices of refraction. The infrared light can be applied, for example, with an infrared semiconductor laser capable of generating a wavelength of 830 nanometers at a power level of 100 microwatts for at least one hour. This electromagnetic energy is applied to one input port of a coupler switch. Subsequently the other input port of a coupler switch is subjected to the same electromagnetic energy for the same time period and power level. The prime purpose is to insure that all waveguides are subjected to the same intensity of radiation for the same time period. The result of this treatment is that the optical switching characteristics of the coupler switch are stabilized for electromagnetic energy transmission at the normal power operating level. As a result, an optical directional coupler switch that is resistant to the problems of optical damage or cross-talk is provided. Additionally, optical directional coupler switches that have suffered optical damage can be restored to their designed transmission characteristics and stabilized through the use of the present process.

In summary, an improved process of both manufacturing an optical directional coupler switch and stabilizing an existing coupler switch is provided along with an improved optical coupler switch that results from the process of the present invention.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE PREFERRED EMBODIMENT

The following description is provided to enable any person skilled in the electro-optical art to make and use the invention, and sets forth the best modes contemplated by the inventors of carrying out their invention. Various modifications, however, will remain readily apparent to those skilled in this field, since the generic principles of the present invention have been defined herein specifically to provide a process of stabilizing an optical directional coupler switch and an improved product by process optical directional coupler switch.

Figure 1:
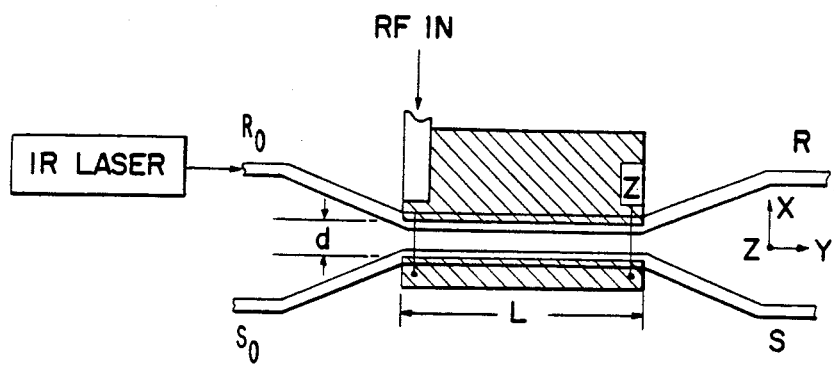
FIG. 1 is a schematic cross-sectional view of an optical directional coupler switch.

An integrated optical directional coupler switch is formed by fabricating two parallel waveguides in such close proximity so that the electromagnetic energy such as light in one waveguide can couple to the other waveguide via the evanescent fields. Referring to FIG. 1, a schematic waveguide directional coupler circuit pattern is illustrated.

Two waveguides with propagation constants $\beta_R$ and $\beta_S$ are brought within a distance d of one another for a length L. Over this length the waveguides are coupled so that optical energy can transfer between the two guides. If the waveguides have the same propagation constants and energy is incident in only one guide, it will transfer completely to the other guide in a distance $l=\pi/2\kappa$, called the transfer length, where $\kappa$ is the coupling coefficient which describes the strength of the interguide coupling. Typically, the coupling coefficient is related to separation between the guides, d, by an exponential relation of the form $$\kappa = \kappa_o \exp(-d/\lambda),$$

where $\kappa_o$ and $\lambda$ are coefficients that depend upon the various waveguide parameters.

Electrically controlled optical switching can be achieved with a directional coupler because the degree-of-light transfer between the waveguides depends upon the difference in propagation constants, $\Delta\beta = \beta_R - \beta_S$, which can be controlled via the electro-optic effect. If the light in the two guides is characterized by complex amplitudes R and S, which vary slowly in the propagation direction, the interaction between the two guides is described by the coupled-wave equations:

$$R' - j\delta R = -j\kappa S, \quad (1)$$

and $$S' + j\delta S = -j\kappa R, \quad (2)$$

where the primes denote differentiation with respect to the propagation direction, $\delta = \Delta\beta/2$, and $\kappa$ is the coupling coefficient. For arbitrary input amplitudes $R_o$ and $S_o$, as shown in FIG. 1, the solution of (1) and (2) can be expressed in matrix form:

$$\begin{bmatrix} R \\ S \end{bmatrix} = \begin{bmatrix} A & -jB \\ -jB^* & A^* \end{bmatrix} \begin{bmatrix} R_o \\ S_o \end{bmatrix}, \quad (3)$$

where the asterisk denotes a complex conjugate. The matrix coefficients are $$A = \cos(\kappa L \sqrt{1+(\delta/\kappa)^2}) + j(\delta/\kappa) \sin(\kappa L \sqrt{1+(\delta/\kappa)^2}) \quad (4)$$

$$B = \sin(\kappa L \sqrt{1+(\delta/\kappa)^2})/\sqrt{1+(\delta/\kappa)^2} \quad (5)$$

If light is launched in the R guide at $z=0$, the power in the two guides at the coupler output $z=L$ is given by $$SS^* = \frac{\sin^2(\kappa L \sqrt{1+(\delta/\kappa)^2})}{1+(\delta/\kappa)^2} R_o R_o^*, \quad (6)$$

and $$RR^* = 1 - SS^*. \quad (7)$$

Equation (6) illustrates several directional coupler properties that are important to the design of optical switches. Energy can transfer completely from one guide to the other only if $\Delta\beta = 0$ and $$\kappa L = (2m+1)\pi/2, \quad (8)$$

where m is an integer. If the guides do not have the same propagation constants it is impossible for energy to be completely transferred across the coupler and some optical energy always remains in the input waveguide. However, in this phase mismatched case ($\Delta\beta \neq 0$), energy exits entirely in the input waveguide only if $$(\kappa L)^2 + (\delta L)^2 = (m\pi)^2 \quad (9)$$

As can be seen from FIG. 1, an optical directional coupler switch formed of a pair of parallel titanium-diffused optical waveguides of ferroelectric LiNbO$_3$ crystal is provided with uniform electrodes placed over the waveguides in the coupling region.

The applied electric fields, normal to the crystal surface, are oppositely directed in each guide so that the linear electro-optic effect produces the phase mismatch between the guides by increasing the refractive index in one guide and decreasing it in the other. Thus control of the refractive index is important in the performance of the switch. The switch is designed so that it is in a crossover state with no voltage applied to the electrodes. This requires fabricating the coupler length to be equal to one transfer length, satisfying Equation (8) above.

The straight-through state is obtained by applying an appropriate voltage to the electrodes to satisfy the phase mismatch condition of Equation (9).

Optical damage changes the refractive index, thereby complicating the switching action due to an applied electric field. The process of the present invention stabilizes and corrects optical damage to insure an increased life cycle for a LiNbO$_3$ optical switch with a minimum of cross-talk.

For the purposes of our invention, optical damage will be considered to be the change in the refractive index of the optical waveguides under waveguide illumination. The result of such optical damage is that the characteristics of the directional coupler switch is altered. This drifting of the refractive index of a directional coupler switch such as diffused titanium lithium niobate switches has been recognized. Because of this inherent problem, directional coupler switches have been generally operated at a low light level using a few tens of a microwatt of laser power in order to minimize optical damage. At the present time infrared semiconductor lasers are capable of emitting several milliwatts of power. The use of low power levels or longer wavelengths to minimize the effect of the optical damage has other disadvantages. The signal-to-noise ratio is low, and long wavelength sources and detectors, e.g., 1300 to 1500 nanometers, are not yet readily available. Additionally, optical damage can still occur, although to a much lesser degree, at the longer wavelengths.

The present invention is directed at providing a process of minimizing the optical damage problem for ferroelectric crystals, and more specifically titanium-diffused lithium niobate directional coupler switches. The present invention allows the use of a higher power illumination, while also reversing the changes to the switch characteristics if they have previously suffered optical damage.

While the preferred embodiment is disclosed with a semiconductor laser capable of providing 100 microwatts of power at 830 nanometers, it is believed that our invention will work also at electromagnetic radiation levels of shorter wavelengths, for example in the visual spectrum.

Broadly, our invention can be described as discovering that, for an operational power level of a laser that will cause optical damage to a coupler switch formed from a ferroelectric crystal, by subjecting each of the input ports of the coupler switch to approximately twice (or greater) the normal operating power level for a sufficient period of time to saturate the waveguides, that the coupler switch characteristics will subsequently be stabilized at the normal operating power. That is, increasing the laser light to both the input ports of the coupler switch will actually rectify the optical damage rather than increase the extent of the optical damage.

Referring to FIG. 1, the optical directional coupler switch has two input ports $R_o$ and $S_o$ and two output ports R and S. Because the two waveguides are in close proximity and comply with the above design equations, they are capable of being coupled to one another so that electromagnetic radiation such as infrared light entering one waveguide will couple to the other. The amount of coupling depends, among other things, upon the separation of the waveguides and the refractive indices. Infrared light entering the switch can be channeled from one waveguide to the other by applying an electric field to induce a relative propagation mismatch between the waveguides. In this way, the switch can be turned "on" and "off." The amount of cross-talk that occurs determines the quality of the switch. That is, the amount of light that can exit a port when it should be off is indicative of the loss of electromagnetic radiation. This loss is dependent upon the refractive indices of the waveguides. Therefore, if the refractive indices of the waveguides change, as in the case of optically-induced damage, the amount of cross-talk changes. Usually, cross-talk is designed to be at a minimum, and hence any increase during the operation of a coupler switch is considered to be optical damage.

Figure 2:
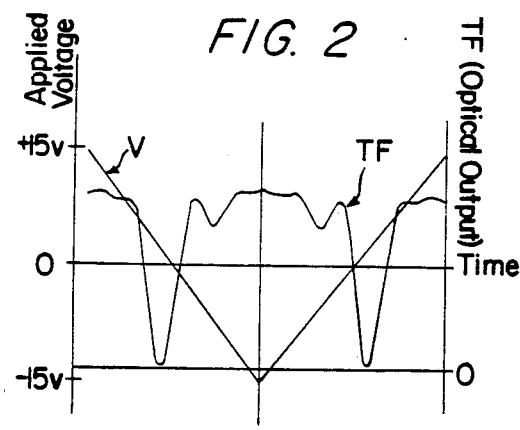
FIG. 2 is a graph of an initial transfer function of a coupler switch.

The process of the present invention is accomplished by optically saturating the device at a power level at least approximately twice the normal operating level of the coupler switch. For example, FIG. 2 is a graph of an initial transfer function of a directional coupler switch when driven by a 30-volt, peak-to-peak sawtooth voltage. The transfer function, TF, discloses the relationship between the optical output for a given applied voltage, V. It characterizes a directional coupler switch and should follow the sine function (Equation 7).

Figure 3:
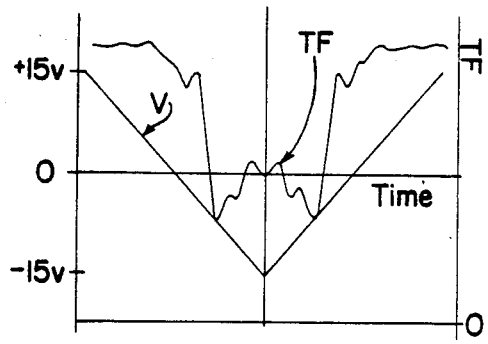
FIG. 3 is a graph of the transfer function of the switch of FIG. 2 after being illuminated for a sufficient time period to disclose optical damage.

As can be seen from FIG. 3, the TF response changes dramatically as a result of optical damage upon illumination from an IR laser at a power level of 50 microwatts for a period of one hour at a wavelength of 830 nanometers. The relationship between the voltage and the TF graph clearly illustrates the effect of optical damage.

Figure 4:
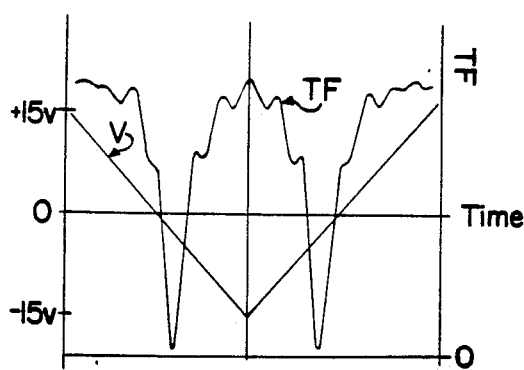
FIG. 4 is a graph of the transfer function of the switch after being stabilized by the process of the present invention.

FIG. 4 illustrates the results of the process of the present invention. To stabilize the optical directional coupler switch, infrared light at least twice as intense (100 microwatts) was focused respectively into both input ports of the switch. The transfer function changed rapidly, within seconds, and then saturated until there was a negligible change. After an hour, the transfer function almost returned to its initial design state, as shown in FIG. 4. When the switch was then subsequently operated at the lower normal power of 50 microwatts, it was discovered that the switch characteristics changed very little. A comparison of the results between FIGS. 2 and 4 verifies that the optical directional coupler switch has been returned to approximately its designed transmission characteristics.

As can be appreciated, the process of the present invention can be used to repair or stabilize optically damaged coupler switches and also can be used as an initial calibration procedure for newly-manufactured coupler switches.

The coupler switch that has been treated by the above process steps is, in effect, a new improved coupler switch with increased operating capacities. The specific theoretical reasons for the results of the present invention are not fully understood other than it is believed that the index of refraction is stabilized at the higher power levels and that the use of a laser source of between 800 nanometers and 900 nanometers has the capacity of fully illuminating a $LiNbO_3$ coupler switch and producing the desired results. It is also believed that an electromagnetic radiation of a shorter wavelength will also produce similar results.

While the time period of one hour has been empirically verified, it is believed that increased power levels greater than twice the normal operating level will permit a shortening of the time period.

In practicing the present invention, the respective input ports were illuminated. However, it is sufficient that the entire waveguides be subject to the same illumination for the same time period to realize the advantage of this invention.

Finally, an initial recording of the transfer function of the coupler switch before applying the electromagnetic energy to the waveguide input ports can be used in a production environment and then a subsequent recording of the transfer function of the coupler switch after applying the inventive process can be made for comparison purposes, e.g., FIGS. 2 and 4, to determine if the coupler switch has been restored to within its initial design transmission characteristics.

As can be readily appreciated, it is possible to deviate from the above example of the present invention, and, as will be readily understood by those skilled in the electro-optical art, the invention is capable of many modifications and improvements within the scope and spirit thereof. Accordingly, it will be understood that the invention is not to be limited by the specific description, but only by the scope and spirit of the appended claims.

What is claimed is:

1. An improved waveguide assembly, of a ferroelectric crystal material having a plurality of input and output ports transmitting electromagnetic energy, for use in an optical directional coupler switch, comprising ferroelectric crystal waveguides having stabilized indices of refraction resulting from the process steps of:
   (a) applying electromagnetic energy in a wavelength range above the visible spectrum at a power level, at least approximately twice the normal operating level of the coupler switch, for a predetermined time period sufficient to saturate the change in the indices of refraction, to one waveguide input port, and
   (b) applying electromagnetic energy in a wavelength range above the visible spectrum at a power level, at least approximately twice the normal operating level of the coupler switch, for a predetermined time period sufficient to saturate the change in the indices of refraction, to another waveguide input port whereby the optical switching characteristics are stabilized for subsequent electromagnetic energy transmission at a normal power operating level.

2. The waveguide assembly of claim 1 wherein the ferroelectric crystal material is $LiNbO_3$ subjected to titanium diffusion.

3. The waveguide assembly of claim 1 wherein the wavelength range of the applied electromagnetic energy is above 800 nanometers.

4. The waveguide assembly of claim 1 wherein the wavelength range of the applied electromagnetic energy is in the infrared spectrum.

5. The waveguide assembly of claim 1 wherein the predetermined time period is approximately one hour at a power level of approximately 100 microwatts.

6. The waveguide assembly of claim 2 wherein the wavelength range of the applied electromagnetic energy is above 800 nanometers from an infrared semiconductor laser and the predetermined time period is approximately one hour at a power level of approximately 100 microwatts.

7. The waveguide assembly of claim 6 wherein the electromagnetic energy is substantially at 830 nanometers.

8. A process of stabilizing an optical waveguide directional coupler switch comprising the steps of:
   (a) applying electromagnetic energy at a power level at least approximately twice the normal operating level of the coupler switch, for a predetermined time period sufficient to saturate the change in the index of refraction through one input port of the coupler switch, and
   (b) applying electromagnetic energy at a power level at least approximately twice the normal operating level of the coupler switch for a predetermined time period sufficient to saturate the change in the index of refraction through the adjacent input port of the coupler switch, whereby the optical switching characteristics of the coupler switch are stabilized for subsequent electromagnetic energy transmission at a normal power operating level.

9. The process of claim 8 wherein the optical directional coupler switch is formed of a ferroelectric crystal material.

10. The process of claim 8 wherein the wavelength range of the applied electromagnetic energy is above 800 nanometers.

11. The process of claim 8 wherein the wavelength range of the applied electromagnetic energy is in the infrared spectrum.

12. The process of claim 8 wherein the predetermined time period is approximately one hour at a power level of approximately 100 microwatts.

13. The process of claim 9 wherein the wavelength range of the applied electromagnetic energy is above 800 nanometers from an infrared semiconductor laser and the predetermined time period is approximately one hour at a power level of approximately 100 microwatts.

14. The process of claim 9 wherein the ferroelectric crystal material is $LiNbO_3$ subjected to titanium diffusion.

15. The process of claim 13 wherein the electromagnetic energy is substantially at 830 nanometers.

16. A process of stabilizing ferroelectric crystal waveguides such as titanium-diffused lithium niobate waveguides in an optical directional coupler switch, having a plurality of input and output ports, including means for switching the transmission of electromagnetic energy between ports comprising the steps of:
   (a) applying electromagnetic energy of a wavelength range within the infrared range at a power level, at least approximately twice the normal operating level of the coupler switch, for a predetermined time period sufficient to saturate the change in the index of refraction, to one waveguide input port, and
   (b) applying electromagnetic energy of a wavelength range within the infrared range at a power level, at least approximately twice the normal operating level of the coupler switch, for a predetermined time period sufficient to saturate the change in the index of refraction, to the adjacent waveguide input port, such that said waveguides are all subjected to the same intensity of applied electromagnetic energy over the same period of time, whereby the optical switching characteristics are stabilized for electromagnetic energy transmission at a normal power operating level.

17. The process of claim 16 wherein the wavelength range of the applied electromagnetic energy is between 800 and 900 nanometers from an infrared semiconductor laser and the predetermined time period is approximately one hour at a power level of approximately 100 microwatts.

18. The process of claim 17 wherein the electromagnetic energy is substantially at 830 nanometers.

19. The process of claim 17 further including the steps of initially recording the transfer function of the coupler switch before applying electromagnetic energy to the waveguide input ports, subsequently recording the transfer function of the coupler switch after applying the electromagnetic energy and comparing the results to determine if the coupler switch has been restored to within its design transmission characteristics.

20. A process for restoring altered optical transmission characteristics of an optically damaged optical directional coupler switch having at least two waveguides, to approximately the designed transmission characteristics, wherein said altered characteristics are due to changes in the refractive indices of said waveguides occuring during transmission of electromagnetic energy therein at a first normal operating power level, said waveguides having respective input and output ports and being appropriately coupled to achieve a switching function, said process comprising the step of:

applying to respective ones of said waveguides through respective ones of said input ports, electromagnetic energy at a second power level which is at least twice said first normal operating power level, for a predetermined period of time sufficient to induce the maximum changes in the refractive indices of said waveguides at said second power level, such that said switch operates approximately with said designed transmission characteristics for subsequent operation at said normal operating level.

21. The process of claim 20 wherein said predetermined period of time bears an inverse relationship to said second power level.

* * * * *